United States Patent [19]

Lemaire et al.

[11] Patent Number: 4,488,219
[45] Date of Patent: Dec. 11, 1984

[54] EXTENDED CONTROL WORD DECODING

[75] Inventors: Charles A. Lemaire; David A. Luick, both of Rochester, Minn.

[73] Assignee: International Business Machines Corporation, Armonk, N.Y.

[21] Appl. No.: 359,323

[22] Filed: Mar. 18, 1982

[51] Int. Cl.³ .............................................. G06F 9/30
[52] U.S. Cl. .................................................. 364/200
[58] Field of Search ... 364/200 MS File, 900 MS File

[56] References Cited

U.S. PATENT DOCUMENTS

| 3,792,441 | 2/1974 | Wymore | 364/200 |
|---|---|---|---|
| 4,042,972 | 8/1977 | Gruner | 364/200 |
| 4,117,536 | 9/1978 | Bodner | 364/200 |
| 4,266,272 | 5/1981 | Berglund | 364/200 |
| 4,293,907 | 10/1981 | Huang | 364/200 |

OTHER PUBLICATIONS

IRE Transactions on Electronic Computers-A Method of Increasing the Number of Orders in a Digital Computer., Jun. 1962, p. 416.
IBM Technical Disclosure Bulletin-"Saving Bits in a Control Store Word by Redefining Branch Fields", Jan. 1982, vol. 24, No. 8.

Primary Examiner—Raulfe B. Zache
Assistant Examiner—David Y. Eng
Attorney, Agent, or Firm—Bradley A. Forrest; Donald F. Voss

[57] ABSTRACT

Extended control word decode circuitry increases the number of simultaneous functions performed during execution of a control word in the central processing unit (CPU) of a computer system. A first field of a control word is decoded into $2^n$ decodes for testing or specifying a first set of CPU conditions. A second field in the control word is decoded into $2^m - X$ decodes for testing or specifying a second set of CPU conditions. The X decodes, which together with the $2^n$ decodes of the first field test or specify multiples or pairs of a third set of CPU conditions and inhibit the $2^n$ decodes from testing or specifying said first set of CPU conditions.

15 Claims, 16 Drawing Figures

OPTIONAL EXTENDED
CPU FUNCTIONS
ENABLED IN PARALLEL
OR INSTEAD OF A, B-BR
BITS

FIG. 2

OPTIONAL EXTENDED
BR BITS ENABLED
IN PARALLEL WITH
THE A, B-BR BITS

TABLE 1-LIMITED B-BR, A/B PAIRS, ETC    CSAR BITS (11), 12, 13
TYPE 1 CONTROL WORDS:

| B-BR ENCODE | A-BR ENCODE=0 | A-BR ENCODE=1 | |
|---|---|---|---|
| 0 | 0, 0 | 1, 0 | ⎫ |
| 1 | 0, 1 | 1, 1 | ⎪ |
| 2 | 0, S6 | 1, S6 | ⎬ B-BR ALONE |
| 3 | 0, S7 | 1, S7 | ⎪ |
| 4 | 0, L=0 | 1, L=0 | ⎭ |
| 5 | L=0, A=0 | L=0, B=0 | ⎫ |
| 6 | L=0, A=2 | L=0, B=2 | ⎬ A-BR/B-BR PAIRS |
| 7 | BUSY, LB MISS | CARRY, SB31 | ⎭ |
| 8 | L=0, A=0, B=0 | L=0, A=3, B=3 | ⎫ |
| 9 | | | ⎬ A, B, C-BR TRIPLES |
| A | | | ⎭ |
| B | END OP, SET CC TYPE X | END OP, SET CC TYPE Y | ⎫ |
| C | RETURN-ROUTINE (1, 1) | RETURN LINK (0, 1) | ⎪ |
| D | RETURN LINK (1, 0) | RETURN LINK (1, 1) | ⎬ OTHER CPU FUNCTIONS |
| E | | | ⎪ |
| F | | | ⎭ |

FIG. 3a

TABLE 6-FUNCTIONS FOR B-BR ENCODE "F"

| A-BR ENCODE | |
|---|---|
| 0 | S7, G3 |
| 1 | S7, G1 |
| 2 | BUSY, LB MISS |
| 3 | CARRY, SB31 |
| ⋮ | |
| F | RETURN TO LINK (0, 1) LEG |

FIG. 3f

TABLE 7-FUNCTIONS FOR B-BR ENCODE "IF" (ONLY AVAILABLE IN TYPE 3 CONTROL WORDS)

FUNCTION:
LOAD CSAR (BITS 10-13)
FROM O-REGISTER (BITS 12-15)

| A-BR ENCODE | |
|---|---|
| 0 | MASK WITH 0000 |
| 1 | MASK WITH 0001 |
| 2 | MASK WITH 0010 |
| 3 | MASK WITH 0011 |
| ⋮ | |
| F | MASK WITH 1111 |

FIG. 3g

TYPE 2, TYPE 3 CONTROL WORDS

TABLE 2 - NORMAL B-BR

| B-BR ENCODE | CSAR BIT 13 |
|---|---|
| 0 | 0 |
| 1 | 1 |
| 2 | S6 |
| 3 | S7 |
| 4 | L=0 |
| ⋮ | ⋮ |
| D | SEE TABLE 4 EXTENDED FUNCTIONS |
| E | SEE TABLE 5 " " " " |
| F | SEE TABLE 6 " " " " |
| 10 | S0 |
| 11 | S1 |
| ⋮ | ⋮ |
| 1F | SEE TABLE 7 EXTENDED FUNCTION |

FIG. 3b

TABLE 3 - NORMAL A-BR

| A-BR ENCODE | CSAR BIT 12 |
|---|---|
| 0 | 0 |
| 1 | 1 |
| 2 | S4 |
| 3 | S5 |
| 4 | L2=0 |
| ⋮ | ⋮ |
| D | A=0 |
| E | A=2 |
| F | B=0 |

FIG. 3c

TABLE 4 - FUNCTIONS FOR B-BR ENCODE "D"

| A-BR ENCODE | | |
|---|---|---|
| 0 | 0, S0 | (A, B PAIR) |
| 1 | 0, S1 | (A, B PAIR) |
| 2 | L=0, AB=0 | (A, B PAIR) |
| 3 | L=0, A=0, B=0 | (A, B, C TRIPLE) |
| 4 | END OP, SET CC TYPE ARITHMETIC (EXTENDED CONTROL CPU FUNCTION) | |
| ⋮ | | |
| F | | |

FIG. 3d

TABLE 5 - FUNCTIONS FOR B-BR "E"

| A-BR ENCODE | | |
|---|---|---|
| 0 | 1, S0 | (A, B PAIR) |
| 1 | 1, S1 | (A, B PAIR) |
| 2 | L=0, AB=3 | (A, B PAIR) |
| 3 | L=0, A=3, B=3 | (A, B, C TRIPLE) |
| ⋮ | END OP, SET CC TYPE LOGICAL | |
| F | | |

FIG. 3e

EXTENDED CONTROL WORD DECODING

TECHNICAL FIELD

The invention relates to control word decoding circuitry in the central processing unit (CPU) of a computer system and more particularly to such circuitry which can increase the number of functions which can be performed simultaneously without increasing the size of the control word.

The invention finds particular utility in computer systems having control words which include several fields for controlling the operation of the computer system.

BACKGROUND ART

Computer systems are generally designed with certain cost and performance objectives. Increased performance with minimum increased cost is always desirable but not always achieved. Control storages and data paths can be increased in width to provide improved performance but that is a relatively expensive solution. On the other hand, cost and performance degrades when the number of control words required to perform additional functions increase. The additional control words are costly in terms of control storage costs, manpower costs for coding the control words and maintenance costs. The requirement of executing a sequence of control words to perform a function obviously is less efficient and slower than executing a single control word to do the same function.

The prior art, in an article in the IRE Transactions On Electronic Computers, June 1962, page 416, entitled "A Method of Increasing the Number of Orders in a Digital Computer", describes a technique of taking bits from one field such as an address field to extend or increase the number of orders which can be specified by the operation code. Not only is this technique entirely different from the present invention, it has certain penalties or disadvantages as pointed out in the article, i.e., a corresponding loss of storage addresses and increased hardware.

The present invention has substantially no loss of function or increase in hardware. This is because bits from one field are not used to increase the size of another field. Rather, some independent decodes from one field are used together with decodes from another field to specify multiples or pairs of dependent decodes. Hence, independent decodes from both fields still exist but the number thereof is reduced. The total number of decodes; however, is increased and the dependent decodes can specify functions of the sacrificed independent decodes and additionally can specify new functions.

The hardware is not substantially increased because the logic circuitry used for non-extended decoding can be used by the present invention. The additional requirement of the present invention is that the logic circuits have more than two inputs and it is not uncommon for control word decode circuitry to be implemented with logic circuits having more inputs than are being used. Also the inhibit function required by the present invention does not require any additional circuitry because both up and down level decodes are available and discrete inverters are not necessary although shown in the drawings to reduce the number of lines.

Thus the present invention increases performance because more functions can be performed during execution of a single control word. Further, since the size of the control word is not increased the costs of the improved performance provided by the present invention is incremental.

DISCLOSURE OF THE INVENTION

The extended control word decode circuitry of the present invention increases the number of simultaneous functions which can be performed during execution of a control word in the central processing unit of a computer system by generating decodes for certain combinations of bits from two or more fields in a control word. Certain decodes of one field are sacrificed as independent decodes and are used to redefine decodes of another field and the normal decodes of this another field are inhibited. The redefined decodes can include the sacrificed independent decodes which now become dependent decodes or can specify new functions. An A field in the control word specifies $2^n$ functions where n is the number of bits in the field. Likewise, a B field in the control word can specify $2^m$ functions where m is the number of bits in the B field. Some, or X, of the decodes of the B field are used to redefine the decodes of the A field. Thus the number of extended decodes is $X \cdot 2^m$ and the number of sacrificed independent decodes is X.

The extended decodes include all A field B field pairs used in the microcode program (although not all pairs possible) prior to extension and therefore no microcode rewrite is necessitated by the present invention. The extended decodes do not restrict address assignment for the control words. The extended decodes can specify CPU functions other than were specified by the independent decodes. Also because the extended decodes of the present invention can specify more functions, it is possible to have a control word with fewer bits in a pair of fields perform the same functions as a control word coded with more bits in the pair of fields without extended decodes.

DESCRIPTION OF THE INVENTION

Figure 1:
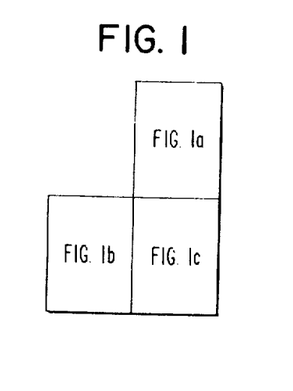
FIG. 1 is a diagram illustrating the arrangement of FIGS. 1a, 1b and 1c.
Figure 1A:
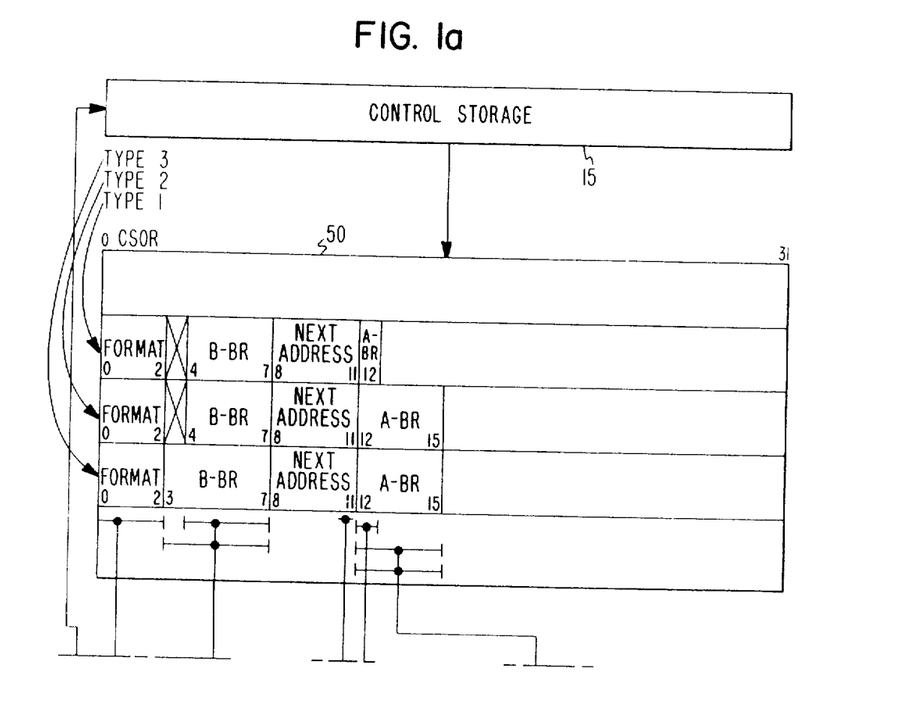
FIGS. 1a, 1b and 1c taken together as in FIG. 1 are a schematic block diagram of the portion of the central processing unit incorporating the present invention.
Figure 1B:
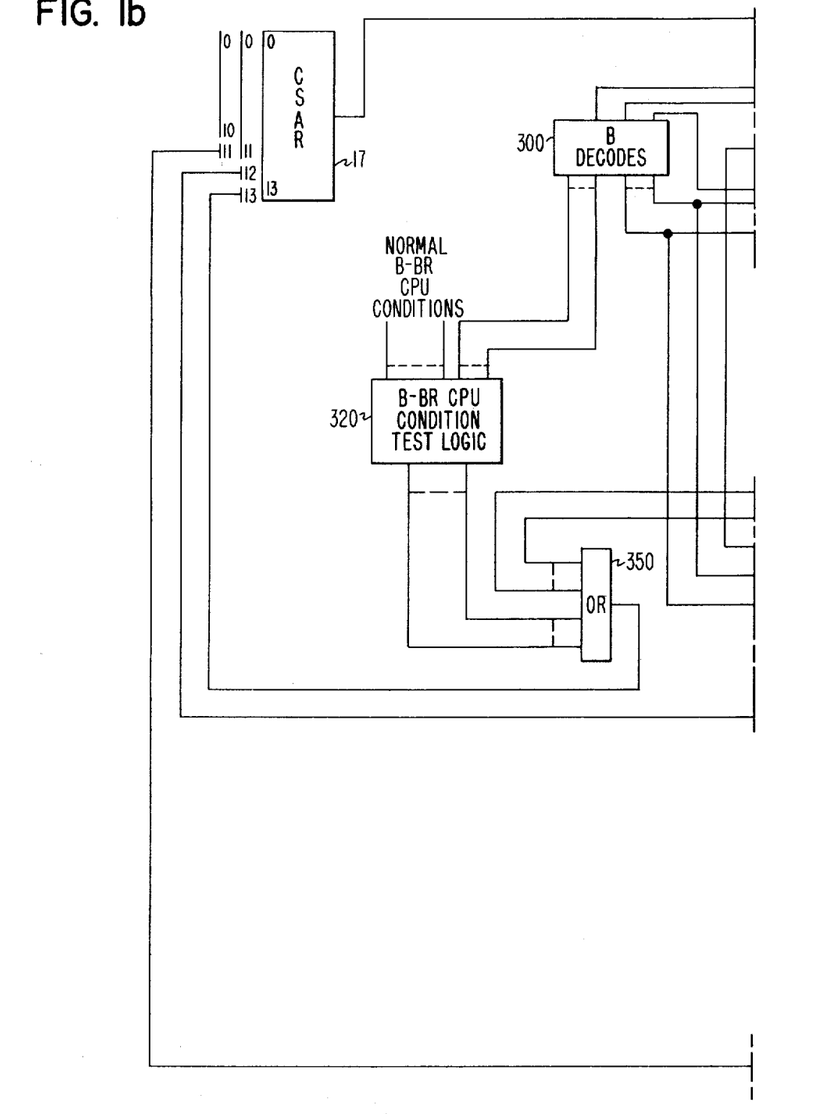
Figure 1C:
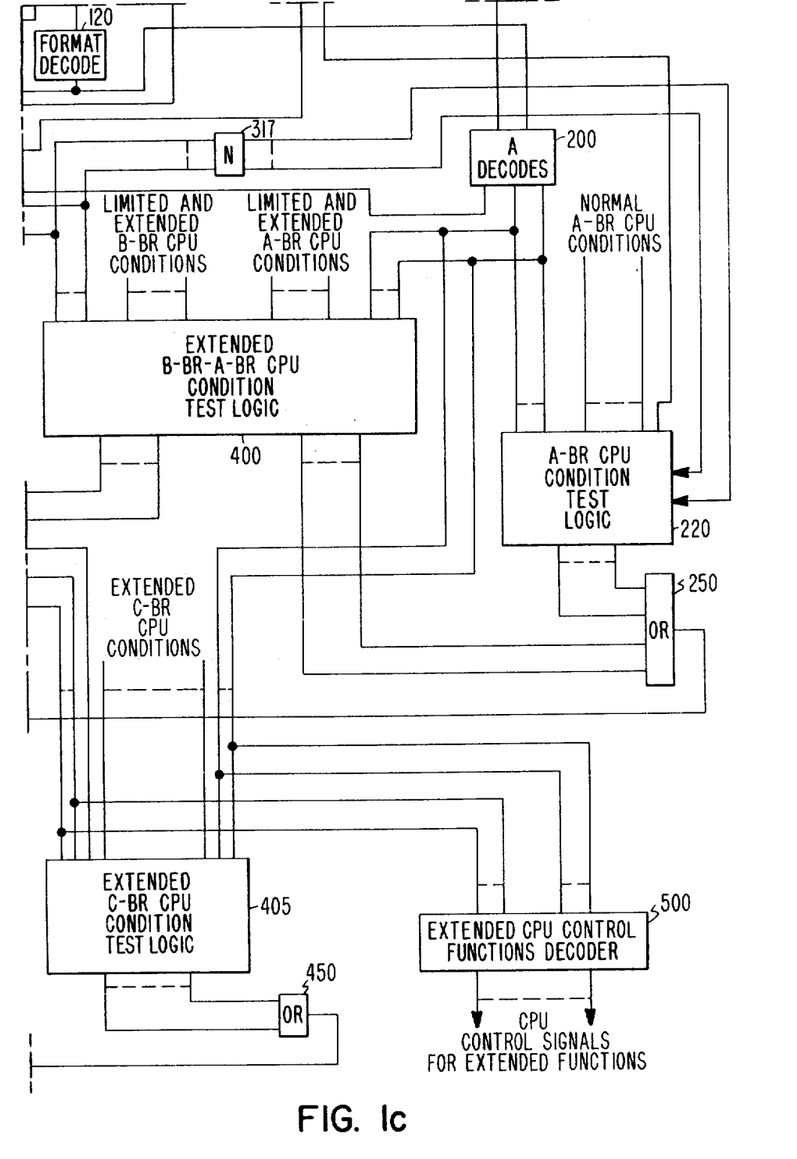

With reference to the drawings and particularly to FIGS. 1a, 1b and 1c, the invention is shown as incorporated in a computer system of the type set forth in U.S. Pat. No. 4,266,272 dated May 5, 1981 for "Transient Block Check Word Generation Control Circuitry" to Berglund, et al. The present invention, of course, modifies the computer system of U.S. Pat. No. 4,266,272 and only those elements of that computer system which are pertinent to the present invention are shown.

The computer system of U.S. Pat. No. 4,266,272 includes a microprocessor which executes control words or microinstructions which are fetched from control storage 15 and entered into control store operation register (CSOR) 50. Control storage 15 is addressed by an address contained in control store address register (CSAR) 17. The microprocessor cycle consists of executing the control word in CSOR 50 and fetching from control storage 15 the next word to be executed. During the generation of the address for the next control word to be executed, the microprocessor has the capability of testing certain central processing unit (CPU) states and conditionally setting up certain next address bits. For simplicity, the next address decode logic of U.S. Pat. No. 4,266,272 is not shown and the certain next address bits which are conditionally set up, i.e. in this example bits 11, 12 and 13, are shown as being directly applied to CSAR 17. Whether or not the conditionally set up next address bits are applied through the next address decode logic or are directly applied to CSAR 17 is a matter of representation only and doesn't affect the scope of the present invention.

It should also be noted that CSOR 50 will normally be considered as storing only one control word but for simplification and reduction of the number of drawings to illustrate the present invention, three different types of control words are shown in CSOR 50. Additionally, the circuitry for performing a read operation of control storage 15 and for controlling the loading of a control word into CSOR 50 and an address into CSAR 17 is not shown and the circuitry for these functions would be the same as the circuitry set forth in the referenced U.S. Pat. No. 4,266,272.

The next address generation logic generally does not change the states of bits 0-7 in CSAR 17. Bits 8-11 of CSAR 17 are generally taken from the four-bit next address field of the control word in CSOR 50. For certain extended branch multiples, as will be seen in connection with type 1 control words, bit 11 is conditionally set. Type 3 control words can conditionally set bits 10-13 of CSAR 17. Bits 12 and 13 of CSAR 17 are set as the result of testing certain CPU conditions specified by the A and B branch fields of the control word in CSOR 50.

Figure 2:
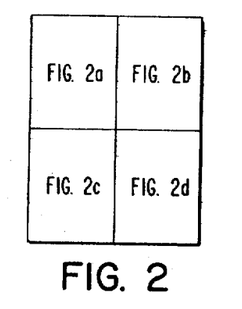
FIGS. 2a, 2b, 2c and 2d taken together as in FIG. 2 are a schematic logic diagram of the decode and the CPU condition test logic; and, FIGS. 3a, 3b, 3c, 3d, 3e, 3f and 3g are tables showing encodes and conditions tested for different types of control words for both normal and extended decodes.
Figure 2A:
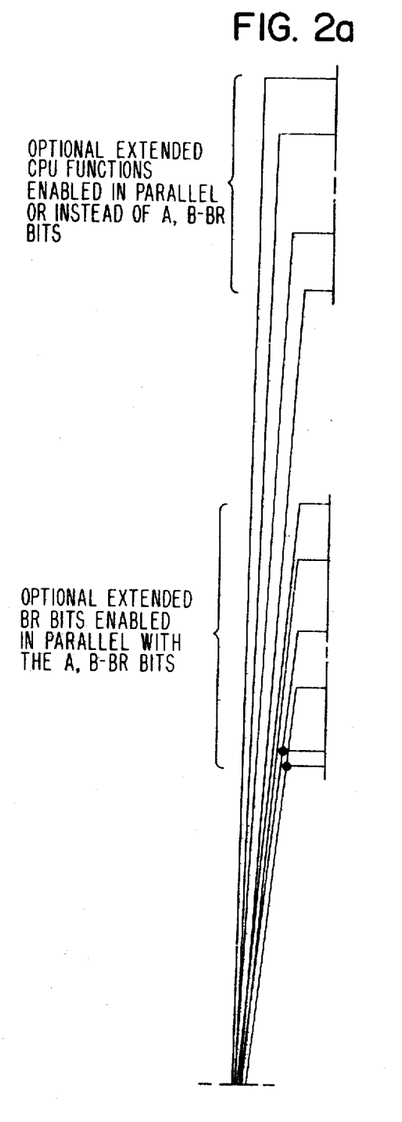
Figure 2B:
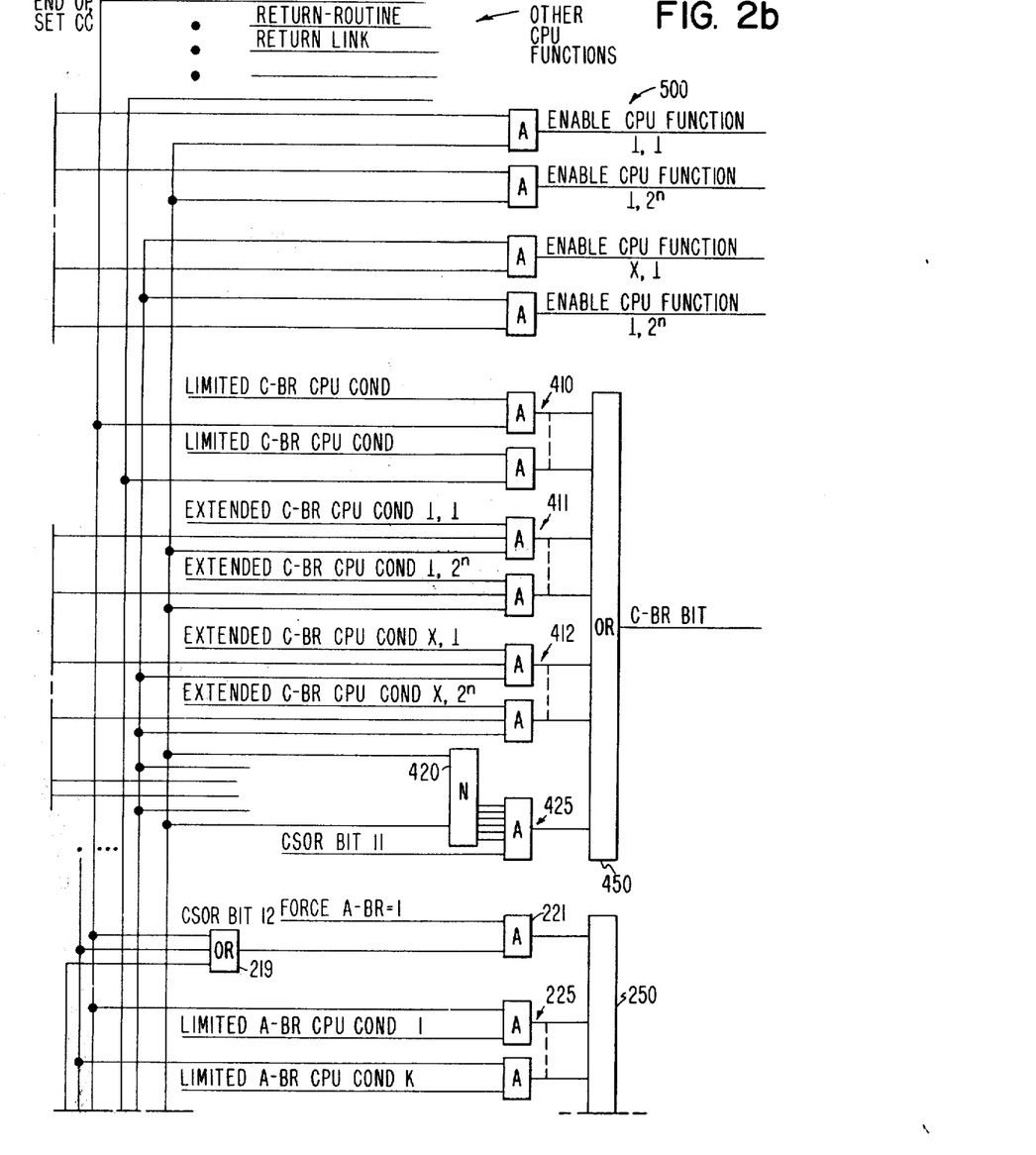
Figure 2C:
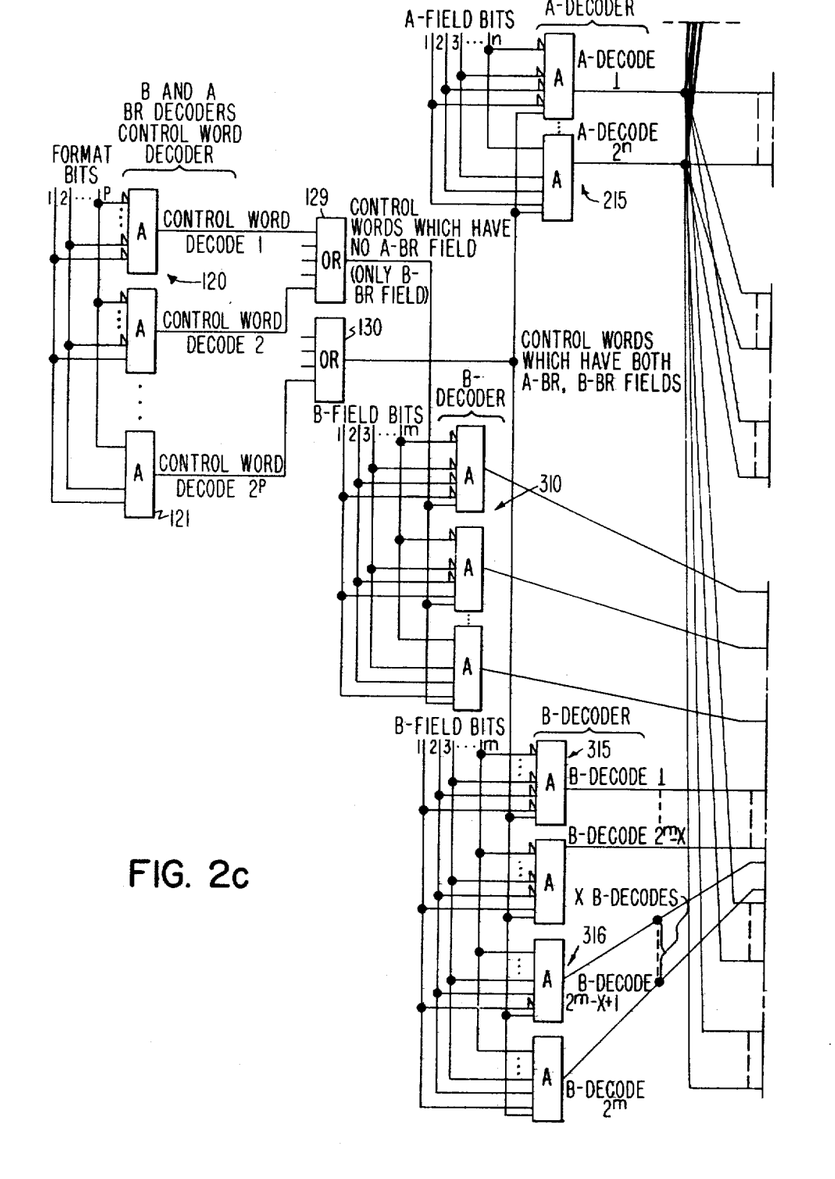
Figure 2D:
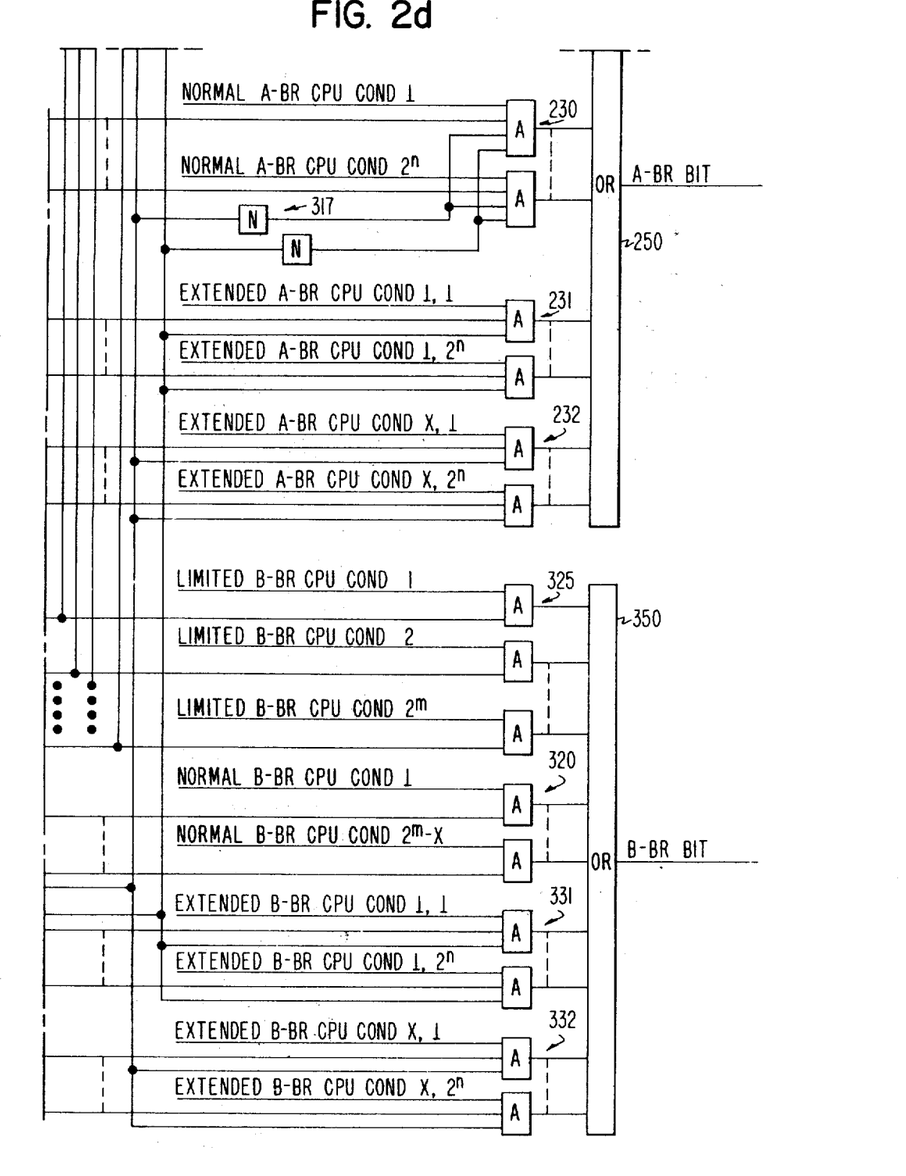

Type 1 control words prior to the present invention were unable to specify A branch/B branch pairs or multiples or other CPU functions using the A branch bit and the B branch field. In the present invention, when a type 1 control word is decoded, the format decode logic 120 determines that the control word is a type 1 control word and has only a B branch field with a single bit for the A branch. The format decode logic 120 provides signals to A decode logic 200 and B decode logic 300. The AND circuits of format decode logic 120 which decode a type 1 control word feed OR circuit 129, FIG. 2 and the output of OR circuit 129 is applied as a conditioning input to AND circuits 310 of the B decode circuitry 300. The AND circuits 310 conditioned by the A output of OR circuit 129 have inputs from bit positions of CSOR 50 corresponding to the B-branch field of the type 1 control word. While all of the AND circuits 310 have the same number of inputs, the first AND circuit of AND circuits 310 has all of its inputs, except the conditioning input, inverted as represented by the wedges on the input lines. The next AND circuit of AND circuits 310 has all inputs but one which have wedges. In other words the inputs into AND circuits 310 are inverted or not so as to enable these AND circuits to perform a binary decode of the inputs.

Figure 3A:
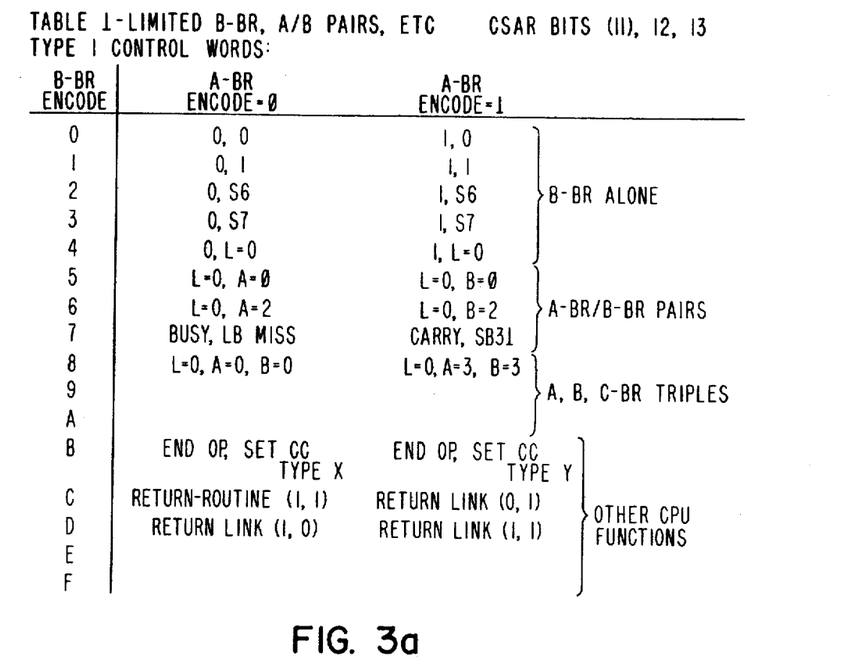

The outputs of the AND circuits 310 feed several groups of AND circuits which will be described in accordance with the B encodes in Table 1. For B branch encodes 0-4 inclusive, the corresponding AND circuits 310 of B decode circuitry 300 condition AND circuit 221 via OR circuit 219 which also has the CSOR bit 12 as an input. AND circuit 221 feeds OR circuit 250 which has its output connected to the bit 12 input of CSAR 17. Thus, as with type 1 control words prior to the present invention, AND circuit 221 passes the state of bit 12 in the control word to bit 12 of CSAR 17 and does not test or specify any CPU condition. The B field decodes do test limited B branch CPU conditions which are applied to AND circuits 325 which are conditioned by AND circuits 310 of the B decode circuitry 300. The outputs of AND circuits 325 feed OR circuit 350 which has its output connected to bit 13 input of CSAR 17.

For the B branch encodes 5-7 inclusive of the type 1 control word, the outputs of corresponding B decoder AND circuits 310 feed AND circuits 225 as well as the corresponding AND circuits 325. AND circuits 225 test limited A branch CPU conditions and AND circuits 325 test limited B branch CPU conditions for type 1 control words. By this arrangement, two conditions can be simultaneously tested, i.e. the A branch bit from one of the AND circuits 225 via OR circuit 250 specifies the result of testing a CPU condtion even in the absence of an A branch field and a B branch bit from one of the AND circuits 325 via OR circuit 350 indicates the state of another CPU condition.

For B branch encodes 8-A inclusive, multiple or triple CPU conditions can be tested simultaneously. The corresponding outputs of B decoder AND circuits 310 in addition to feeding AND circuits 225 and AND circuits 325 also feed AND circuits 410 for testing limited C branch CPU conditions. The outputs of AND circuits 410 feed OR circuit 450 which has its output connected to the bit 11 input of CSAR 17.

Other CPU functions as in the past can be specified by the B branch encodes B-F inclusive of the type 1 control word. The corresponding outputs of AND circuits 310 also directly provide the signals for specifying the other CPU functions for B branch encodes of B-F inclusive. The extended CPU control functions include such functions as END OP, Set Condition Code (CC), Return to Routine and Return to Link. Thus the present invention preserves the limited B branch without a corresponding limited A branch and the other CPU functions as in prior arrangements and additionally with the same type of control words, provides branch pairs or enables multiple CPU conditions to be tested, using extended control word field decoding.

Figure 3B:
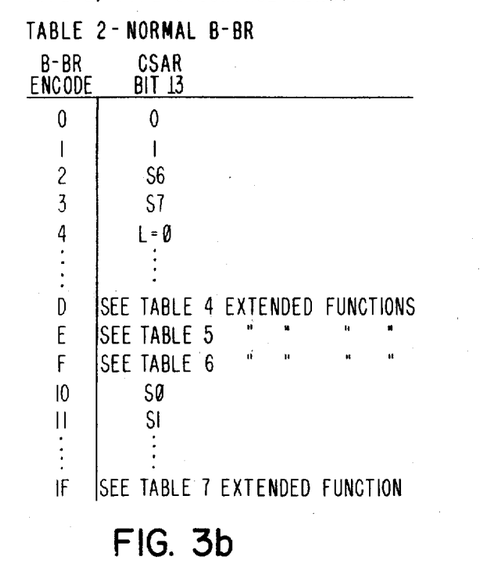
Figure 3C:
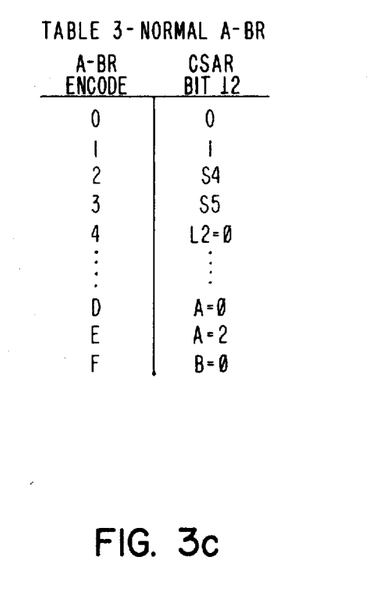

Type 2 and type 3 control words each include an A branch and a B branch field. For type 3 control words the B branch field has one additional bit. As seen in Table 2 of FIG. 3b, certain B branch codes, i.e. D, E, and F, specify extended functions by generating A branch/B branch pairs. Type 2 and type 3 control words are identified by AND circuits 121 of format decode circuit 120. Those AND circuits 121 which identify type 2 and type 3 control words feed OR circuit 130 and its output is connected to condition AND circuits 315 and AND circuits 316 of B decodes 300. Logical AND circuits 315 and 316 have outputs from bit positions of CSOR 50 corresponding to the B field of type 2 and type 3 control words. The inputs to AND circuits 315 and 316 have wedges, as appropriate, much in the same manner as AND circuits 310 to perform a binary decode of the B field, but AND circuits 315 include the decodes 1 to $2^m - X$ and AND circuits 316 include the decodes $2^m - X + 1$ to $2^m$. The outputs of AND circuits 315 feed AND circuits 320 for testing CPU conditions which, as in the past, are normal B branch CPU conditions. The outputs of logical AND circuits 316 feed AND circuits 331 and AND circuits 332 for testing extended B branch CPU conditions as well as AND circuits 231 and AND circuits 232 for testing extended A branch CPU conditions simultaneously with the testing of the extended B branch CPU conditions.

The outputs of bit positions of CSOR 50 corresponding to the A field of type 2 and type 3 control words feed AND circuits 215. The inputs to AND circuits 215 have wedges, as appropriate, to perform a binary decode of the A field. The outputs of AND circuits 215 for decoding the A field are redefined by also feeding AND circuits 331 and AND circuits 332 as well as feeding AND circuits 231 and AND circuits 232. In order to accommodate the multiple definitions of the outputs of AND circuits 215, the outputs of AND circuits 316 are applied to inverters 317 which are connected to inhibit AND circuits 230 when there are outputs from AND circuits 316 and thereby prevent the testing of normal A branch CPU conditions. The testing of normal A branch CPU conditions is performed by AND circuits 230 for type 2 and type 3 control words when the decodes of the A field satisfy one of the AND circuits 230 and there are no outputs from AND circuits 316.

From the foregoing it is seen that AND circuits 215 provide inputs to AND circuits 230 for testing normal A branch CPU conditions. The normal B branch CPU conditions are tested by AND circuits 320 which are conditioned by AND circuits 215 of the B branch decodes 300. AND circuits 316 of the B branch decodes 300 provide inputs for testing extended functions for A branch and B branch pairs.

Figure 3D:
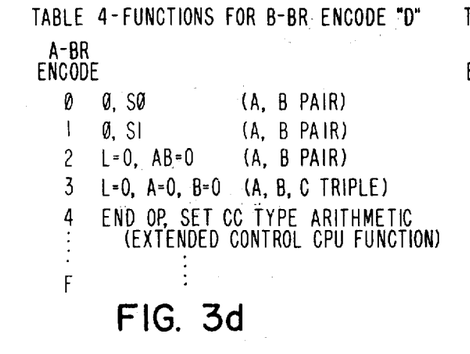
Figure 3E:
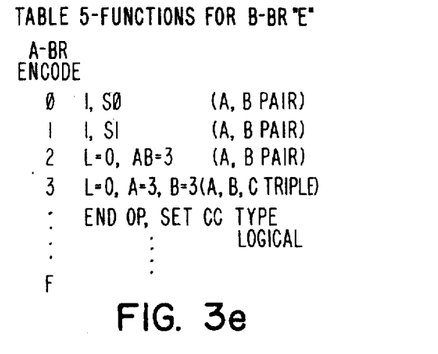
Figure 3F:
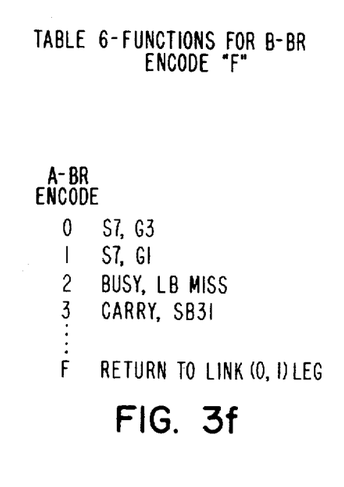
Figure 3G:
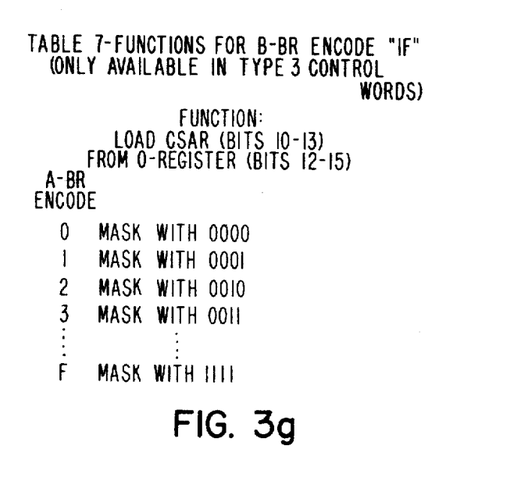

The logic circuits 231, 232, 331 and 332 for testing extended A branch and B branch CPU conditions are represented by block 400 in FIG. 1. It should be noted that to limit the drawings only two sets of AND circuits, i.e., AND circuits 231, 331 and AND circuits 232 and 332 are shown but there would be as many sets of AND circuits as necessary to redefine the outputs of AND circuits 215 in order to obtain the desired extended encoding, i.e., tables 4, 5 and 6 of FIGS. 3d, 3e and 3f.

The AND circuits 221, 225 and 230 for testing forced, limited and normal A branch CPU functions and the AND circuits 231 and 232 for testing expanded A branch CPU conditions feed OR circuit 250. The AND circuits 320, 325, 331 and 332 for testing normal, limited and extended B branch CPU conditions feed OR circuit 350. The outputs of OR circuits 250 and 350 provide the bits 12 and 13 respectively of CSAR 17.

In addition to branch pairs, the present invention provides extended decoding to test multiple CPU conditions by connecting the outputs of AND circuits 316 to inputs of AND circuits 411 and 412 for testing extended C branch CPU conditions. The AND circuits 411 and 412 feed OR circuit 450 and the output of this OR circuit is connected to provide bit 11 of CSAR 17. By this arrangement, multiple CPU conditions can be tested simultaneously because there will also be outputs from OR circuits 250 and 350 simultaneously with the output from OR circuit 450. It should be noted that only two sets of AND circuits, i.e., AND circuits 411 and AND circuits 412 are shown but as previously stated, there would be as many sets as necessary to redefine the outputs of AND circuits 215 to test multiple CPU conditions.

Bit 11 of CSAR 17 can also be set from the next address field of the control word in CSOR 50. Bit 11 of CSOR 50 is connected to an input of AND circuit 425 which also has inputs from inverters 420 which are connected to some of the outputs of AND circuits 316 of B decode circuit 300. Thus, when some of AND circuits 316 are not providing any output, inverters 420 condition AND circuit 425 to pass bit 11 from CSOR 50 to CSAR 17. The various extended C branch CPU conditions tested for the type 2 and type 3 control words are set forth in Tables 4 and 5. The optional extended CPU functions which are enabled in parallel with or instead of A and B branch bits from OR circuits 250 and 350 are set forth in Table 7. These extended functions in Table 7 are available only in type 3 control words and are enabled by outputs of AND circuits 500.

From the foregoing, it is seen that the present invention increases the number of simultaneous functions which can be performed during execution of a control word by sacrificing independent decodes of one field to redefine decodes of another field and inhibit the normal decodes of this another field. The redefined decodes can include some of the sacrificed independent decodes which become dependent decodes and, additionally, new functions can be specified. Also, some functions which were previously available only in control words with a 5-bit B branch field can now be performed by control words having a 4-bit B branch field as well as control words with a 4-bit B branch field and only a single bit for the A branch. This provides for expansion in the future because unused extended decodes are left as spares. It is thus seen that while the present invention sacrifices certain independent decodes, the functions specified by these sacrificed independent decodes are preserved and extended functions are brought into being.

We claim:

1. Extended logic decode circuitry in a central processing unit (CPU) of a computer system for decoding fields of a control word to increase the number of combinations of functions represented by the fields of the control word, said extended logic decode circuitry including first logic means having inputs from one of said fields and operable to generate a first set of $2^n$ independent decodes, second logic means having inputs from said first set of $2^n$ independent decodes and inputs representing a first set of conditions provided by said CPU for generating a signal as a function of the state of one of said first set of conditions and one of said first set of independent decodes, third logic means having inputs from another of said fields and operable to generate a second set of $2^m$ independent decodes where said second set of independent decodes is separated into $2^m - x$ and x decodes, fourth logic means having inputs from $2^m - x$ decodes of said second set of $2^m$ independent decodes and inputs representing a second set of conditions provided by said CPU for generating a signal as a function of the state of one of said second set of conditions and one of said second set of independent decodes, the improvement comprising:

fifth logic means having inputs consisting of said first set of independent decodes from said first logic means, an input from one of said x decodes of said second set of independent decodes and inputs representing a third set of conditions provided by said CPU and operable to generate signals as a function of the state of at least one of the third set of conditions, one of said first set of decodes and said one of said x decodes, and, means connecting said one of said x decodes to inhibit said second logic means when said one of said x decodes is in a predetermined state.

2. Extended logic decode circuitry, in a central processing unit (CPU) of a computer system having sets of selected conditions, for decoding fields of a control word fetched from an addressable control storage and entered into a control storage operation register in response to an address in an address register addressing said control storage to increase the number of combinations of functions represented by the control word, said extended logic decode circuitry including first logic means having inputs from one of said fields and operable to generate a first set of $2^n$ independent decodes, second logic means having inputs from said first set of $2^n$ independent decodes and inputs representing a first set of conditions in said CPU for generating a signal indicative of the state of one of said first set of conditions, third logic means having inputs from another of said fields and operable to generate a second set of $2^m$ independent decodes where said second set of independent decodes is separated into $2^m-x$ and x decodes, fourth logic means having inputs from $2^m-x$ decodes of said second set of $2^m$ independent decodes and inputs representing a second set of conditions in said CPU for generating a signal indicative of the state of one of said second set of conditions, the improvement comprising:

fifth logic means having inputs consisting of said first set of independent decodes from said first logic means, an input from one of said x decodes of said second set of independent decodes and inputs representing a third set of conditions in said CPU and operable to generate multiple signals where at least some of said multiple signals are indicative of multiple states of said third set of conditions and, means connecting said one of said x decodes to inhibit said second logic means when said one of said x decodes is in a predetermined state.

3. The extended logic decode circuitry of claim 2 wherein said third set of conditions include all of the conditions specifiable by said second set of $2^m$ independent decodes.

4. The extended logic decode circuitry of claim 2 wherein at least one of said multiple signals is applied to said address register as an address bit.

5. The extended logic decode circuitry of claim 2 wherein at least one of said multiple signals is applied as a signal for further controlling operations in said CPU.

6. Extended logic decode circuitry in a central processing unit (CPU) of a computer system having sets of CPU functions which operate on selected CPU conditions provided by the CPU for decoding fields of a control word to increase the number of combinations of functions represented by the fields of the control word, said extended logic decode circuitry including first logic means having inputs from one of said fields and operable to generate a first set of $2^n$ independent decodes, second logic means having inputs from said first set of $2^n$ independent decodes and operable to specify one of a first set of CPU functions, third logic means having inputs from another of said fields and operable to generate a second set of $2^m$ independent decodes where said second set of independent decodes is separated into $2^m-x$ and x decodes, fourth logic means having inputs from $2^m-x$ decodes of said second set of $2^m$ independent decodes and operable to specify a second set of CPU functions, the improvement comprising:

fifth logic means having inputs consisting of said first set of independent decodes from said first logic means, an input from one of said x decodes of said second set of independent decodes and operable to generate multiple signals where at least some of said multiple signals are pairs of signals to specify pairs of CPU functions and, means connecting said one of said x decodes to inhibit said second logic means when said one of said x decodes is in a predetermined state.

7. The extended logic decode circuitry of claim 6 wherein said first set of CPU functions include designations of source data, said second set of CPU functions include designations of destination data and said specified pairs of CPU functions include specification of pairs of designations of source and destination data.

8. The extended logic decode circuitry of claim 7 wherein said pairs of designations of source and destination data include all designations of destination data specifiable by said second set of $2^m$ independent decodes.

9. The extended logic decode circuitry of claim 7 wherein at least one of said multiple signals is applied as a signal for further controlling operations in said CPU.

10. The extended logic decode circuitry of claim 7 where the designated source data and designated destination data are operated upon by said CPU and the results of the operation are returned to said destination data.

11. Extended logic circuitry, in a central processing unit (CPU) of a computer system having parallel processing branches, for decoding fields of a control word to increase the number of sets of functions represented by the control word, the extended logic decode circuitry including first logic means having inputs from one of said fields and operable to generate a first set of independent decodes, second logic means coupled to a first branch having inputs from said first set of independent decodes and inputs representing a first set of conditions provided by the CPU for generating a signal indicative of the state of one of the first set of conditions, third logic means having inputs from another of said fields and operable to generate a second set of decodes having dependent and independent decodes and, fourth logic means coupled to a second branch having inputs from independent decodes of the second set of decodes and inputs representing a second set of conditions provided by the CPU for generating a signal indicative of the state of one of the second set of conditions, the improvement comprising:

fifth logic means having inputs consisting of the first set of independent decodes from the first logic means, an input from one of the dependent decodes of the second set of decodes and inputs representing a third set of conditions provided by the CPU and operable to generate at least one signal indicative of selected conditions from the third set of conditions, and means coupled to the selected second dependent decode to inhibit at least one of the second and fourth logic means when the selected second dependent decode is in a predetermined state.

12. The extended logic decode circuitry of claim 11 wherein the means coupled to the selected second dependent decode inhibits both of the second and fourth logic means.

13. The extended logic decode circuitry of claim 11 wherein the fifth logic means generates a pair of signals indicative of the state of a pair of the third set of conditions.

14. The extended logic decode circuitry of claim 12 wherein the fifth logic means generates a pair of signals indicative of the state of a pair of the third set of conditions.

15. The extended logic decode circuitry of claim 12 wherein the fifth logic means provides at least one decode to each of the parallel processing branches as a function of the first set of independent decodes and selected decodes of the second set of dependent decodes.

* * * * *